(12) United States Patent
Bonk et al.

(10) Patent No.: US 11,039,230 B2
(45) Date of Patent: Jun. 15, 2021

(54) DEVICE AND METHOD FOR CONTROLLING UPSTREAM TRANSMISSION OF BURSTS IN A PASSIVE OPTICAL NETWORK

(71) Applicant: Nokia Solutions and Networks Oy, Espoo (FI)

(72) Inventors: Rene Bonk, Pforzheim (DE); Robert Borkowski, Stuttgart (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/794,644

(22) Filed: Feb. 19, 2020

(65) Prior Publication Data

US 2020/0296487 A1    Sep. 17, 2020

(30) Foreign Application Priority Data

Mar. 14, 2019 (EP) .................................. 19162719

(51) Int. Cl.
*H04Q 11/00* (2006.01)
*H04B 10/079* (2013.01)

(52) U.S. Cl.
CPC ... *H04Q 11/0067* (2013.01); *H04B 10/07955* (2013.01); *H04Q 2011/0083* (2013.01); *H04Q 2011/0086* (2013.01)

(58) Field of Classification Search
None
See application file for complete search history.

(56) References Cited

U.S. PATENT DOCUMENTS

| | | | |
|---|---|---|---|
| 7,970,281 B2 | 6/2011 | Bouda | |
| 8,326,152 B2 | 12/2012 | Van Veen et al. | |
| 9,300,427 B2 | 3/2016 | Hirth et al. | |
| 9,391,712 B2 | 7/2016 | Luo et al. | |

(Continued)

FOREIGN PATENT DOCUMENTS

| | | |
|---|---|---|
| WO | WO-2002/097476 A2 | 12/2002 |
| WO | WO-2007/092346 A1 | 8/2007 |
| WO | WO-2018/137674 A1 | 8/2018 |

OTHER PUBLICATIONS

Neda Cvijetic et al., "100 Gb/s optical access based on optical orthogonal frequency-division multiplexing" IEEE Communications Magazine, vol. 48, No. 7, Jul. 1, 2010.

*Primary Examiner* — David W Lambert
(74) *Attorney, Agent, or Firm* — Harness, Dickey & Pierce, P.L.C.

(57) ABSTRACT

A device for controlling upstream transmission of bursts from optical network units (ONUs) to an optical line termination (OLT) in a passive optical network (PON), wherein the upstream transmission is organized in time intervals that form part of an upstream timeframe, includes obtain respective optical power levels received at the OLT for the ONUs; obtain respective extinction ratios at the OLT for the ONUs; obtain respective transmission wavelengths for the ONUs; distinguish pairable ONUs and non-pairable ONUs at least based on the wavelengths; pair the pairable ONUs based on the optical power levels and/or the extinction ratios to generating one or plural subsets of paired ONUs; allow paired ONUs that belong to a same subset to simultaneously transmit bursts within a time interval.

10 Claims, 8 Drawing Sheets

(56) References Cited

U.S. PATENT DOCUMENTS

2007/0183779 A1\* 8/2007 Bouda ................. H04J 14/0246
    398/72
2009/0092394 A1    4/2009 Wei et al.
2015/0365172 A1\* 12/2015 Luo ..................... H04B 10/572
    398/137

\* cited by examiner

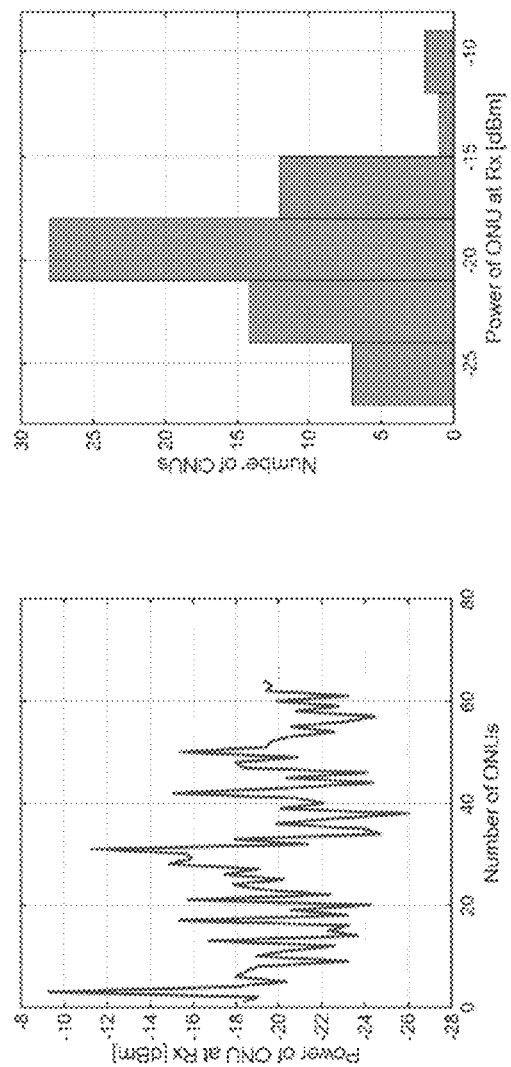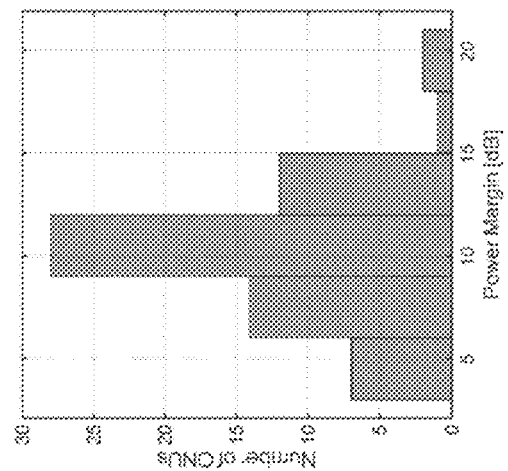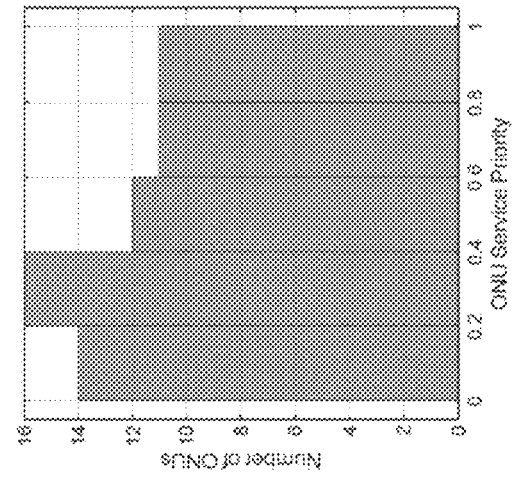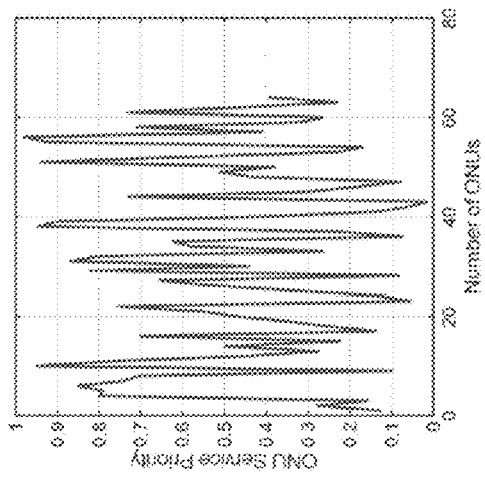

DEVICE AND METHOD FOR CONTROLLING UPSTREAM TRANSMISSION OF BURSTS IN A PASSIVE OPTICAL NETWORK

CROSS-REFERENCE TO RELATED APPLICATIONS

The present application claims priority under 35 U.S.C. § 119 to European Patent Application No. 19162719.9, filed on Mar. 14, 2019, in the European Patent Office, the entire contents of each of which are hereby incorporated by reference.

TECHNICAL FIELD

Various example embodiments relate to controlling upstream transmission of bursts from optical network units, abbreviated ONUs, to an optical line termination, abbreviated OLT, in a passive optical network, abbreviated PON. More particularly, example embodiments concern a more optimized allocation of time intervals in a time domain multiplexed passive optical network, abbreviated TDM-PON, in a wavelength division multiplexed PON, abbreviated WDM-PON, or in a time and wavelength division multiplexed PON, abbreviated TWDM-PON, to ONUs for upstream transmission of bursts.

BACKGROUND

In a Passive Optical Network (abbreviated PON), an optical line termination (abbreviated OLT) in a central office (abbreviated CO) is coupled to multiple optical network units (abbreviated ONUs) in respective optical endpoints via an optical distribution network (ODN). The ODN typically has a tree and branch architecture and comprises optical fibres and passive splitter/combiners that split the optical signals in the downstream direction from OLT to ONUs, and multiplexes the optical signals in the upstream direction from ONUs to OLT. In a simple example where a CO is connected to n optical endpoints, n being a positive integer number, the OLT at the CO is connected via an optical fibre—the so-called feeder fibre—to a 1:n passive optical splitter which in turn is connected via n optical fibres—the so-called distribution fibres—to the n ONUs in the respective optical endpoints. To avoid collisions amongst the n users on the shared part of the ODN, for instance the feeder fibre in the above example, a time domain multiplexing (abbreviated TDM) protocol is used in the downstream direction and a time domain multiple access (abbreviated TDMA) protocol is used in the upstream direction.

Currently, TDM-PONs with symmetrical downstream and upstream throughput capacity of 10 Gbit/s (Gigabit per second) are deployed and TDM-PONs with symmetrical downstream and upstream throughput capacity of 25 Gbit/s are under standardization. Future telecommunication networks, in particular metro and access networks, however will increasingly demand higher throughput capacities and reduced latency. It is expected that following TDM-PON generations may support unsymmetrical downstream and upstream capacities wherein the upstream capacity remains at 10 Gbit/s or 25 Gbit/s for cost reason of the high-speed optical transceivers at the customer side.

Existing PON technologies like GPON and XGS-PON rely on a TDMA protocol in the upstream direction. A timeframe with predefined length of for instance 125 microseconds is subdivided in fixed length or variable length time intervals. Depending on the number of active ONUs in the PON and their respective service and/or latency demands, a dynamic bandwidth assignment (DBA) controller allocates time intervals to ONUs. Such an allocation or grant allows a single ONU to transmit an upstream burst in a time interval assigned to that ONU.

SUMMARY

The ever-increasing capacity needs and low latency requirements are difficult to achieve with the low-cost target for optical transceivers, especially at the customer side. The upstream path could therefore become the bottleneck in future PONs.

Amongst others, it is therefore an object of embodiments of the invention to disclose a device and method for controlling upstream transmission of bursts, a single burst being a consecutive set of bits continuously upstream transmitted whereas multiple bursts are typically transmitted discontinuously, in a TDMA PON that allows to increase the overall throughput and/or reduce the individual latency for ONUs while respecting the low-cost requirement for optical transceivers at the ONUs. In other words, embodiments of the invention aim at an increased flexibility to act on fast changing service demands from users while minimizing the optical transceiver cost at ONU side.

This above-defined object is achieved, according to a first example aspect of the present disclosure, by a device as defined by claim 1, for controlling upstream transmission of bursts from ONUs to an OLT in a PON, the upstream transmission being organized in time intervals that form part of an upstream timeframe, wherein the device comprises:

means configured to obtain respective optical power levels received at the OLT for the ONUs;

means configured to obtain respective extinction ratios at the OLT for the ONUs;

means configured to obtain respective transmission wavelengths for the ONUs;

means configured to distinguish pairable ONUs and non-pairable ONUs amongst the ONUs at least based on the wavelengths;

means configured for pairing the pairable ONUs based on the optical power levels and/or the extinction ratios, thereby generating one or plural subsets of paired ONUs;

means configured for allowing paired ONUs that belong to a same subset amongst the subsets to simultaneously transmit bursts within a time interval of the upstream timeframe.

Thus, embodiments of the invention optimize the upstream direction of a PON in terms of throughput and latency by allowing certain ONUs to transmit bursts simultaneously. Pairable ONUs are paired, meaning they are combined in subsets, and a time interval within the timeframe can be allocated to a subset of paired ONUs such that multiple paired ONUs can transmit their bursts simultaneously within the allocated time interval. An advantage thereof is that longer time intervals or a longer burst duration spanning multiple time intervals can be allocated to other, non-pairable ONUs, effectively increasing the upstream throughput or capacity and/or reducing the waiting time to transmit data, also known as the latency, for these ONUs with higher service demands.

By pairing ONUs and allowing paired ONUs to simultaneously transmit bursts, new modulation formats are generated that must be demodulated by the receiver at the OLT. Because not all combinations of ONUs generate modulation formats that are allowable, embodiments of the controller first determine which ONUs can be paired, i.e. which subsets of ONUs are allowable. Thereto, the controller at least collects the transmission wavelength of each ONU, being the optical wavelength used for upstream transmission by the ONU, the controller collects the power level of each ONU, being the received signal power in dB measured at the OLT when the ONU upstream transmits in traditional TDMA mode where the ONU occupies a time interval that is not shared with other ONUs, and the controller collects the extinction ratio of each ONU, being the distance in dB between the signal strength of that ONU when transmitting a zero bit (bit value=0) and the signal strength of that ONU when transmitting a one bit (bit value=1). The wavelengths, power levels and extinction ratios of the low service priority ONUs enable the controller to determine which ONUs can be paired in subsets. It is noticed that these pairs or subsets not necessarily need to contain the same amount of ONUs: as an example, two ONUs may be paired to form a couple of ONUs jointly generating within the time interval assigned to this ONU pair a PAM-4 (Pulse Amplitude Modulation 4) modulation format with four power levels instead of the traditional two power levels, three other ONUs may be paired to form a triplet of ONUs jointly generating within the time interval assigned to this ONU subset a PAM-8 (Pulse Amplitude Modulation 8) modulation format with 8 power levels instead of the traditional two power levels, etc. Only when the wavelengths, measured power levels of the ONUs and the extinction ratios of the ONUs reveal that sufficient distinguishable power levels at the OLT receiver are generated by overlapping bursts of the ONUs, the ONUs can be combined.

Sample embodiments of the device for controlling upstream transmission in a PON, as defined by claim 2, further comprise:

means configured for allowing a non-pairable ONU to transmit a burst spanning multiple time intervals.

Indeed, advantageous embodiments of the controller allow non-pairable ONUs to transmit longer bursts spanning multiple consecutive time intervals within a timeframe, thereby effectively increasing the bit rate of these ONUs and/or reducing the latency of these ONUs. Alternative embodiments of the controller may assign plural non-consecutive time intervals within a timeframe to a single non-pairable ONU, also increasing the effective bit rate or decreasing the latency of such ONU, but requiring the ONU to transmit plural bursts that fit within the respective assigned time intervals. Still further alternate embodiments of the controller may adapt the length of the time intervals within a timeframe and create longer time intervals assigned to respective non-pairable ONUs, again increasing the effective bitrate and/or reducing the latency of such ONUs.

In sample embodiments of the device for controlling upstream transmission in a PON, as defined by claim 3, the means configured for pairing are adapted to statically pair the pairable ONUs in a static configuration of subsets.

Indeed, the pairing of ONUs in subsets can be performed statically such that predefined subsets or combinations of pairable ONUs are created based on their power levels and extinction ratios. The static bandwidth assignment to ONUs in this case depends on the active ONUs, their service demands enabling to categorize them as non-pairable ONUs or pairable ONUs, their wavelengths, power levels and extinction ratios and optional other parameters allowing to pair the pairable ONUs. The static bandwidth allocation, i.e. which time intervals of a timeframe are assigned to which non-pairable ONUs or which pairable ONU subsets, may for instance be stored in a look-up table.

In sample embodiments of the device for controlling upstream transmission in a PON, as defined by claim 4, the means configured for pairing are adapted to dynamically pair the pairable ONUs on the basis of updated service demands from the ONUs into a dynamic changing configuration of subsets.

Indeed, more advanced embodiments of the controller learn possible pairing combinations of ONUs by analysing the wavelengths, power levels and extinction ratios thereof, and dynamically adapt the bandwidth allocation, i.e. the assignment of time intervals to ONUs or ONU subsets, depending on the specific, individual service needs of the ONUs that vary over time. A single ONU may for instance have to upstream transmit a first transmission container, abbreviated TCONT, with high service priority followed by a second transmission container with low service priority. For transmission of the first TCONT, the ONU may be considered as a non-pairable ONU whereto one or several time intervals are assigned that are not shared with other ONUs. For transmission of the second TCONT, the same ONU may thereafter be considered as a pairable ONU that is paired with one or plural other ONUs, compatible given their wavelengths, power levels and extinction ratios, to form a subset of ONUs that transmit overlapping bursts in time intervals assigned thereto. Dynamic adaptation of the pairing of ONUs further increases the flexibility and consequently also the gain in overall upstream throughput and/or reduction in overall waiting time to transmit upstream data.

Sample embodiments of the device for controlling upstream transmission in a PON, as defined by claim 5, further comprise:

means configured for instructing an ONU of the pairable ONUs to adapt its optical transmit power and/or its extinction ratio and/or its wavelength and/or its phase.

Indeed, depending on the individual ONU parameters like the wavelength, the measured power levels and extinction ratios, embodiments of the controller may generate requests for one or several ONUs to adapt their output power level for upstream transmission, their extinction ratio, their wavelength or their phase (by applying a phase shift or time shift) in order to generate an increased number of potential subsets of ONUs that can be paired, or to increase the number of ONUs that can be paired within a certain subset, or to facilitate that certain ONUs can be paired. Such embodiments of the controller in other words instruct ONUs to adapt certain ONU parameters in order to further enhance the flexibility in pairing ONUs and consequently further improve the achievable gain in overall upstream throughput and/or reduction in overall waiting time to transmit upstream data. Obviously, such embodiments of the controller require ONUs equipped with technology to adapt the ONU parameters, like for instance a heater enabling to adapt the wavelength of the transmitted upstream signal, an optical attenuator enabling to adapt the upstream transmit power level, a transmitter with variable electrical voltage swing enabling to adapt the extinction ratio, a phase/time shifter, etc. Adapting the power level and or the extinction ratio shall result in new power levels of the signals received at the OLT, hence creating new modulation formats that may be allowable. Adapting the wavelength shall result in reducing or avoiding interferometric crosstalk, such that ONUs that were not pairable now become pairable.

Sample embodiments of the device for controlling upstream transmission in a PON, as defined by claim 6, further comprise:

means configured for obtaining capacity demands and/or latency demands from the ONUs in order to enable distinguishing the pairable ONUs from the non-pairable ONUs amongst the ONUs.

Indeed, although the service priority level of ONUs may be preconfigured statically in alternate embodiments, advantageous embodiments determine the service priority level of ONUs dynamically in view of received capacity demands or latency requirements from the ONUs that may vary over time, for instance for different TCONTs related to different services but transmitted by the same ONU. ONUs with low service priority demands, i.e. capacity and/or latency demands below certain thresholds, become pairable. ONUs with high service priority demands, i.e. capacity or latency demands that exceed certain thresholds, become non-pairable. The decision to classify an ONU as pairable, low service priority ONU or non-pairable, high service priority ONU may be threshold based. If a service priority between 0 and 1 is calculated for each ONU from its bit rate and latency demands, a service priority higher than or equal to 0.6 may for instance require the use of a single burst within a time interval to avoid any latency penalty from time-stacking, hence classifying such ONUs as non-pairable, high service priority ONUs. ONUs with a service priority below 0.6 in such embodiment will be classified as pairable, low service priority ONUs that can be time-stacked.

Sample embodiments of the device for controlling upstream transmission in a PON, as defined by claim 7, further comprise:

means configured for instructing an ONU to add idle data to its burst and/or to add a phase shift or time shift to equalize the length of the bursts simultaneously transmitted within the time interval by paired ONUs that belong to the same subset.

This way, in case that particular ONUs could be time-stacked by pairing them into a single subset and assigning a single time interval to this subset of ONUs for upstream transmission of bursts, but the individual lengths of the bursts of these ONUs are not ideal for being time-stacked, embodiments of the controller can request idle data to be added by one or plural ONUs to their bursts or to apply a phase/time shift in order to simplify the reception at OLT side of the new modulation format. Alternatively, the controller may allow one or several ONUs to transmit plural, shorter bursts within the assigned time interval to align the data transmissions of time-stacked ONUs and simplify the reception at the OLT side. Allowing ONUs to transmit multiple bursts reduces the impact on throughput compared to embodiments that instruct to send idle data or apply a phase/time shift.

Sample embodiments of the device for controlling upstream transmission in a PON, as defined by claim 8, further comprise:

means for obtaining respective power margins for the ONUs; and therein:

the means configured for pairing the low service priority ONUs are adapted to generate a subset of three paired ONUs whose respective power margins exceed a first power margin threshold, preferably 8.5 dB, to generate a subset of two paired ONUs whose respective power margins exceed a second power margin threshold smaller than the first power margin threshold, preferably 4.8 dB, and to leave ONUs whose power margin is smaller than 4.8 dB unpaired.

Pairing of ONUs into subsets for time-overlapping burst transmission requires that a certain power margin be available at the OLT receiver for these ONUs. The power margin is ideally about 4.8 dB for pairing two ONUs and about 8.5 dB for pairing three ONUs. In a sample embodiment of the controller the means for pairing ONUs for instance generate subsets of two ONUs upon the condition that the power margin of these ONUs exceeds 4.8 dB, and generate subsets of three ONUs upon the condition that the power margin of these ONUs exceeds 8.5 dB. ONUs with a power margin below 4.8 dB shall not be paired with other ONUs.

According to a second example aspect a method is disclosed, as defined by claim 9, for controlling upstream transmission of bursts from ONUs to an OLT in a PON, the upstream transmission being organized in time intervals that form part of an upstream timeframe, wherein the method comprises:

obtaining respective optical power levels received at the OLT for the ONUs;

obtaining respective extinction ratios at the OLT for the ONUs;

obtaining respective transmission wavelengths for the ONUs;

distinguishing pairable ONUs and non-pairable ONUs amongst the ONUs at least based on the wavelengths;

pairing the pairable ONUs based on the optical power levels and/or the extinction ratios, thereby generating one or plural subsets of paired ONUs;

allowing paired ONUs that belong to a same subset amongst the subsets to simultaneously transmit bursts within a time interval of the upstream timeframe.

According to a third example aspect a computer program product is disclosed, as defined by claim 10, comprising computer-executable instructions for causing a device for controlling upstream transmission of bursts from ONUs to an OLT in a PON, the upstream transmission being organized in time intervals that form part of an upstream timeframe, to perform at least the following:

obtaining respective optical power levels received at the OLT for the ONUs;

obtaining respective extinction ratios at the OLT for the ONUs;

obtaining respective transmission wavelengths for the ONUs;

distinguishing pairable ONUs and non-pairable ONUs amongst the ONUs at least based on the wavelengths;

pairing the pairable ONUs based on the optical power levels and/or the extinction ratios, thereby generating one or plural subsets of paired ONUs;

allowing paired ONUs that belong to a same subset amongst the subsets to simultaneously transmit bursts within a time interval of the upstream timeframe.

According to a fourth example aspect a computer readable storage medium is disclosed, as defined by claim 11, comprising computer-executable instructions for performing the following steps when the program is run on a device for controlling upstream transmission of bursts from ONUs to an OLT in a PON, the upstream transmission being organized in time intervals that form part of an upstream timeframe:

obtaining respective optical power levels received at the OLT for the ONUs;

obtaining respective extinction ratios at the OLT for the ONUs;

obtaining respective transmission wavelengths for the ONUs;

distinguishing pairable ONUs and non-pairable ONUs amongst the ONUs at least based on the wavelengths;

pairing the pairable ONUs based on the optical power levels and/or the extinction ratios, thereby generating one or plural subsets of paired ONUs;

allowing paired ONUs that belong to a same subset amongst the subsets to simultaneously transmit bursts within a time interval of the upstream timeframe.

BRIEF DESCRIPTION OF THE DRAWINGS

Some example embodiments will now be described with reference to the accompanying drawings.

FIG. 8A-8G illustrate the input parameters for a sample embodiment of the device and method for controlling upstream transmission during a simulation;

DETAILED DESCRIPTION OF EMBODIMENT(S)

Figure 1:
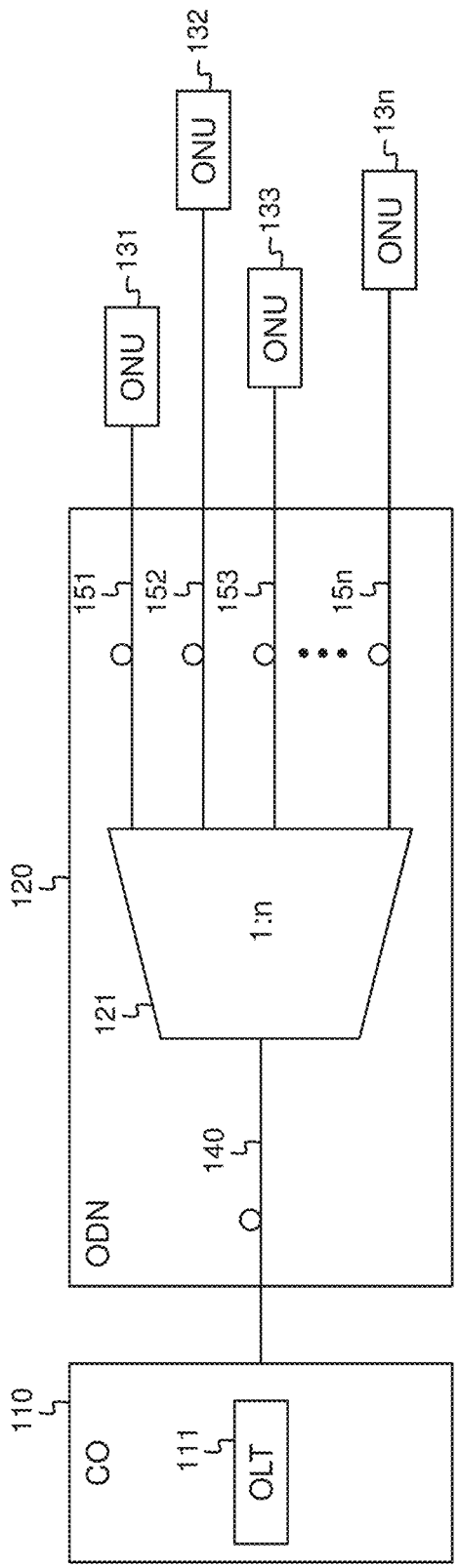
FIG. 1 shows an example implementation of a passive optical network wherein example embodiments of the device and method for controlling upstream transmission can be deployed.

FIG. 1 shows the typical architecture of a Passive Optical Network or PON. An optical line termination, OLT or 111, at a central office, CO or 110, is coupled to multiple optical endpoints or ONUs, 131, 132, 133, . . . 13n, via an optical distribution network, ODN or 120. The optical distribution network 120 has a tree-and-branch architecture and thereto comprises a optical feeder fibre 140, a passive 1:n splitter/multiplexer 121, and n optical distribution fibres 151, 152, 153, . . . , 15n or drop fibres that connect the passive optical splitter 121 to respective ones of the ONUs 131 . . . 13n. In example embodiments, n may for instance be 64. Typically, the central office 110 shall host multiple OLTs, similar to OLT 111. In example embodiments, 8 OLTs or 16 OLTs may for instance be integrated on a single linecard. The feeder fibre 140 is shared for downstream transmissions towards multiple ONUs and upstream transmissions from multiple ONUs. To avoid collisions between the n users sharing the PON, a time-division multiplexing or TDM protocol is used in downstream direction and a time-division multiple access or TDMA protocol is used in upstream direction. The ONUs 131 . . . 13n in other words receive data in different time intervals and transmit data in different time intervals assigned to them. The upstream time intervals assigned to the ONUs may have equal or different lengths and jointly form a timeframe of for instance 125 microseconds.

Figure 2:
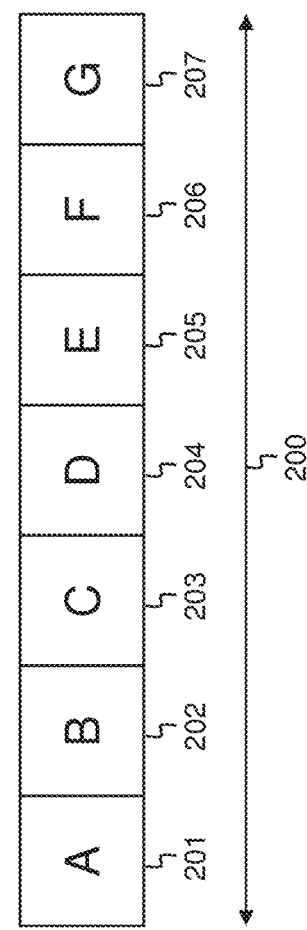
FIG. 2 illustrates the outcome of traditional upstream bandwidth allocation in a TDMA PON.

FIG. 2 illustrates the assignment of time intervals 201-207 that jointly form a timeframe 200 of for instance 125 microseconds in the upstream channel of a traditional existing PON system, operating for instance in accordance with the ITU-T PON standard specification. Each time interval 201-207 is assigned to a single ONU referred to by A-G in FIG. 2. Thus, each time interval can convey a single burst in upstream direction, from a single ONU to the OLT. No burst overlapping or time-stacking of bursts is allowed. At the OLT side, a traditional NRZ (Non-Return to Zero) receiver can receive and demodulate the optical signals received from the different ONUs A-G in different time intervals.

Figure 4:
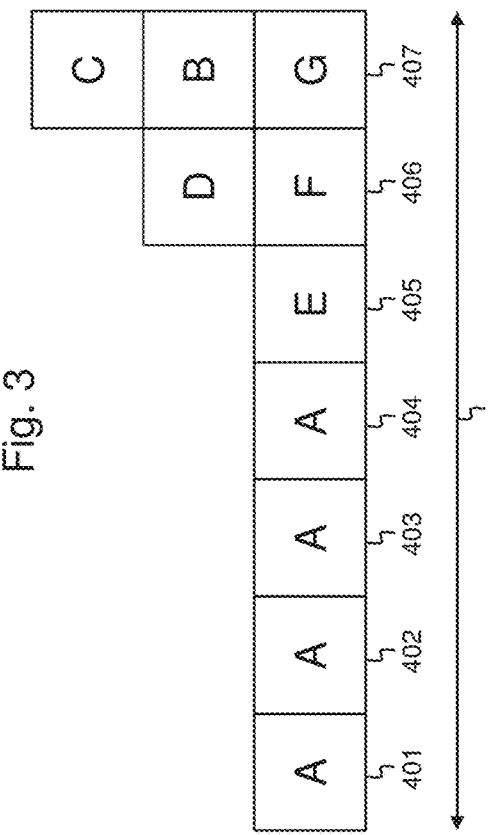
FIG. 4 illustrates an example outcome of upstream bandwidth allocation according to embodiments of the device and method for controlling upstream transmission.

Contrary to the traditional allocation of time intervals as illustrated by FIG. 2, embodiments of the method and system according to the invention optimize the upstream channel of a PON in terms of throughput and latency by allowing multiple ONUs to transmit bursts simultaneously. For instance, lower service priority ONUs B, C, D, F and G can be assigned time intervals 406, 407 within the timeframe 400 in which multiple ONUs can transmit their bursts simultaneously. This is illustrated by FIG. 4 where ONU D and F are assigned time interval 406 allowing these two ONUs to simultaneously transmit their bursts in a time-stacked manner. Similarly, the ONUs B, C and G are assigned time interval 407 allowing these three ONUs to simultaneously transmit their bursts in a time-stacked manner. Thus, power cross-talk by multiple ONUs is intentionally introduced to form new modulation formats. At the OLT side, a more complex receiver shall be used to receive and demodulate PAM4 signals in time interval 406 and PAM8 signals in time interval 407. If bursts from multiple ONUs are time-stacked (overlapped) in one or plural time intervals of the timeframe, plural time intervals 401-404 and/or a longer burst duration can be allocated to other, non-stacked ONUs like ONU A in FIG. 4. An advantage thereof is that the capacity or throughput of the latter ONU A is effectively increased and the wait time to transmit data is decreased, effectively reducing the latency for ONU A.

Figure 3:
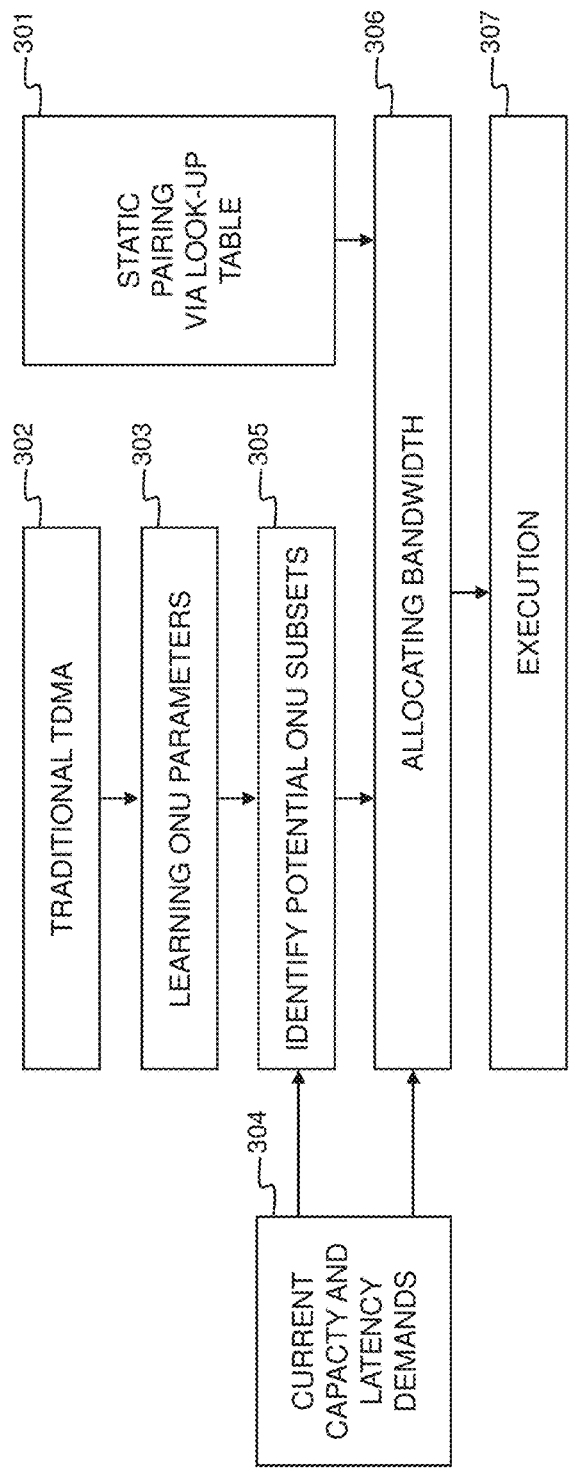
FIG. 3 represents a pseudo flow-chart or a functional block scheme illustrating embodiments of the method or device for controlling upstream transmission.

The pseudo-flow diagram or functional block scheme of FIG. 3 illustrates the steps in embodiments of the method for controlling upstream transmission of bursts in a PON that allows time-stacking as illustrated by FIG. 4 or the functional blocks of embodiments of a device for controlling upstream transmission of data that allows time-stacking as illustrated by FIG. 4. In general, a distinction is made between the static assignment of step/functional block 301 and the dynamic assignment involving steps/functional blocks 302-305.

In case of static assignment in step/functional block 301, potential subsets of ONUs that can be time-stacked are known a-priori to connecting the ONUs to the PON network. The required knowledge can be obtained by pre-characterization of the ONU transmitter, the wavelength used for upstream transmission, the output power and extinction ratio, and the insight that the infrastructure provider or network operator has in the ONU location, and therefore also for instance in power losses to bridge the fibre distance between a particular ONU and the OLT. From these ONU and/or PON parameters, the upstream bandwidth allocation controller can determine potential time-stacking configurations, i.e. subsets of ONUs that can be paired for simultaneous transmission of upstream bursts in a single time interval, and these static pairing configurations can be stored in a look-up table. Plural possible static pairing configurations can be determined and stored in the look-up table. Depending on the activity and/or demands of the ONUs collected in step/functional block 304, a particular static pairing configuration can be selected in step/functional block 306 and be executed in step/functional block 307.

Alternatively, the dynamic assignment of upstream bandwidth of steps/functional blocks 302-305 is applied. In the initial steps/functional blocks 302-303 of the dynamic assignment, the upstream bandwidth allocation controller learns information about the ONUs and the PON network. Thereto, in step/functional block 302, the PON system is operated with a single burst only per allocated time interval, i.e. using the traditional TDMA upstream operation. In this phase the OLT obtains knowledge of the ONUs' upstream wavelength, the received optical power at the OLT and extinction ratio, and possibly also collects additional ONU and/or PON parameters like for instance the state of polarization of the received signals, the phase, the spectral excursion, etc. The data is collected over multiple timeframes in step/functional block 303.

In the next step/functional block, 305, the upstream bandwidth allocation controller calculates possible subsets of the ONUs, for example pairs or triplets of the ONUs, based on the collected individual ONU parameters of step/functional block 303. The potential subsets are stored and can be applied in operation depending on the activity and actual needs of the various ONUs, i.e. their throughput capacity and latency demands as received in step/functional block 304. For example, ONUs' bursts that have lower-priority data to convey (i.e. low service priority TCONTs) can be stacked in time allowing ONUs with higher-priority data (i.e. high service priority TCONTs) to transmit a longer time within the same timeframe, effectively increasing the throughput of the latter high priority ONUs. Multiple iterations for optimization can be applied to identify and optimize the ONU combinations. One parameter that is considered to generate ONU pairs and triplets is the wavelength used by the ONUs for upstream transmission. A possible further parameter that can be used to generate the ONU pairs and triplets is the strength of the received optical power at the OLT from the different ONUs. Another possible parameter that can be used is the ONUs' extinction ratio. The received optical power levels and the extinction ratios of the ONUs allows to determine the received power levels for 0 and 1 bits transmitted by these ONUs. These received power levels must be at sufficient distance from each other for ONUs to become pairable in a single subset. Time-stacking or pairing of ONUs indeed will generate new modulation formats at the OLT receiver, e.g. PAM-4, PAM-8, etc., the different optical power levels of which must be at distances from each other that exceed the sensitivity of the OLT receiver.

Depending on the ONU functionality, the upstream bandwidth allocation controller can also generate requests for adapting the output power level, the extinction ratio and/or the wavelength of individual ONUs to increase the number of potential ONU pairs or triplets. This procedure requires a certain power margin from the network deployment to be available in the original PON system. The power margin is ideally about 4.8 dB for pairing two ONUs and about 8.5 dB for pairing three ONUs. ONUs could for instance be equipped with a heater or alternate wavelength adapting technology that enables to adapt the wavelength to avoid unwanted interferometric cross-talk instead of the desired power cross-talk. ONUs could also be equipped with an optical attenuator at their transmitter enabling to adapt the output power, and/or they could be equipped with a variable electrical voltage swing enabling to adapt their extinction ratio.

In case that particular bursts could be time-stacked in terms of available power levels from the respective ONUs that transmit these bursts, but the individual length of two or more time-stacked bursts are not identical, embodiments of the upstream bandwidth allocation controller may instruct certain ONUs to add idle data to their transmitted bursts, and/or to apply a phase shift or time shift in order to align the time-stacked bursts and enable simplified reception at the OLT receiver. However, adding idle data or applying a phase/time shift will be done at the expense of reduced throughput in comparison to allowing ONUs to send plural bursts within a time interval or allowing ONUs to send longer bursts within a time interval.

The OLT receiver implementation in embodiments of the invention can be manifold. Either a configuration of NRZ-OOK (Non-Return to Zero On-Off-Keying) and PAM-x (Pulse Amplitude Modulation) receivers are used or ADC (analogue-to-digital conversion) with DSP (Digital Signal Processing) functions can be applied to implement the reception and demodulation of the more complex modulation formats resulting from time-stacking of ONUs. The latter approach based on ADC and DSP would offer the capability to perform averaging or even successive interference cancellation to restore the signals from the individual ONUs.

In step/functional block 306, named the bandwidth allocation, the knowledge obtained in the previous static or dynamic ONU pairing and constant updates of the ONUs' capacity and latency demands as received in step/functional block 304 are used to build a bandwidth map for the upstream direction, as for example shown in FIG. 4. The capacity and latency demands collected in step/functional block 304 may for instance be obtained from status reporting of the ONUs' MAC (Media Access Control) layer and reporting of TCONTs priority levels.

In the execution step/functional block 307, the time interval assignment and time-stacking calculated in the previous steps depending on the capacity and latency demands of ONUs as well as on ONU specifications like the received power levels at the OLT and extinction ratios, are applied to the individual active ONUs.

In the example allocation illustrated by FIG. 4, it is assumed that ONU A has to convey a large amount of high priority, low latency, data. As a consequence, ONU A gets allocated four time intervals instead of the single timeslot that was allocated in the traditional process illustrated by FIG. 2. Some other ONUs are assumed to be pairable, like ONU D and F, and ONU B, C and G.

Figure 5A:
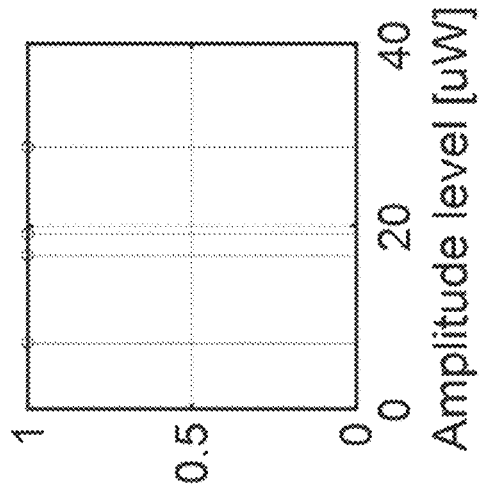
FIG. 5A-5C illustrate examples of new modulation formats resulting from the pairing of two ONUs with different optical power levels at the OLT and identical extinction ratios.
Figure 5B:
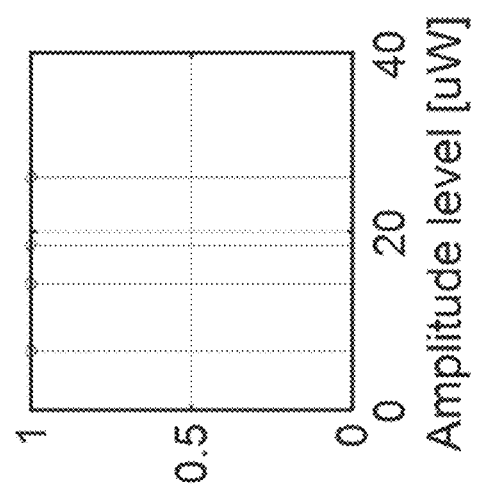
Figure 5C:
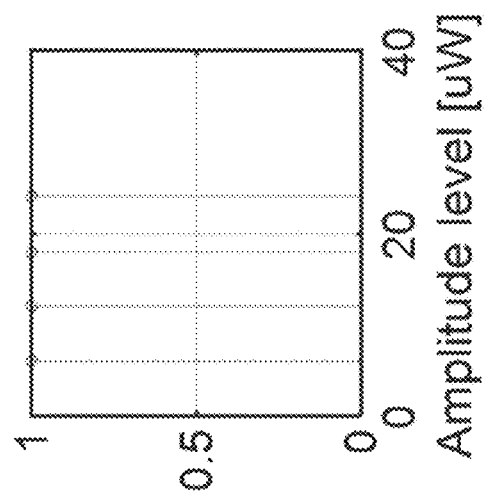

FIG. 5A-5C illustrate examples of new modulation formats resulting from the pairing of two ONUs with different optical power levels at the OLT and identical extinction ratios. In the example of FIG. 5A it is assumed that a first ONU with received optical power level at the OLT of −20 dBm and extinction ratio of 6 dB is paired with a second ONU with received optical power level at the OLT of −21 dBm and extinction ratio of 6 dB. In the example of FIG. 5B it is assumed that a first ONU with received optical power level at the OLT of −20 dBm and extinction ratio of 6 dB is paired with a second ONU with received optical power level at the OLT of −22 dBm and extinction ratio of 6 dB. In the example of FIG. 5C it is assumed that a first ONU with received optical power level at the OLT of −20 dBm and extinction ratio of 6 dB is paired with a second ONU with received optical power level at the OLT of −23 dBm and extinction ratio of 6 dB. As illustrated by FIG. 5A-5C, the signals of the paired ONUs are combined to generate PAM4 modulation format at the OLT receiver. Depending on the power levels and the extinction ratios either equidistant PAM4 is generated (as in FIG. 5C) or non-equidistant PAM4 is generated (as in FIG. 5A and FIG. 5B).

Figure 6A:
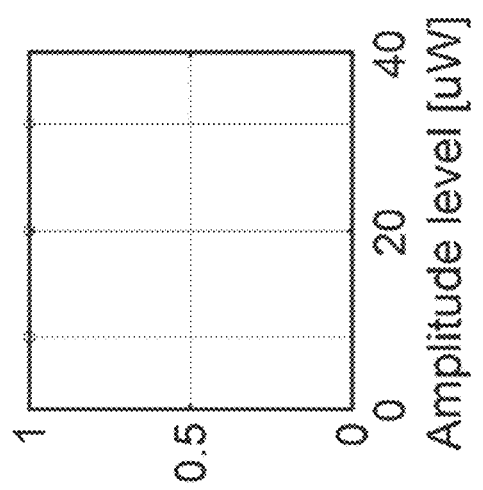
FIG. 6A-6C illustrate examples of new modulation formats resulting from the pairing of two ONUs with equal optical power levels at the OLT receiver and different extinction ratios.
Figure 6B:
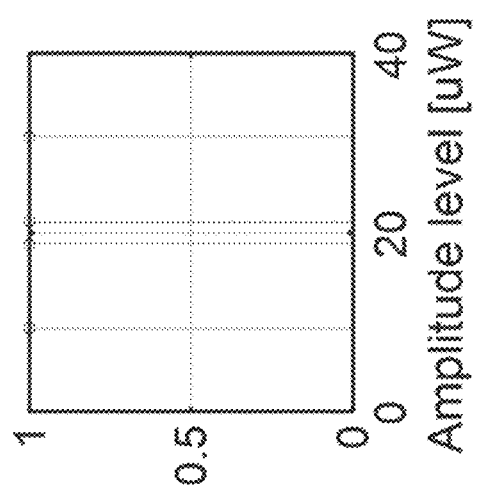
Figure 6C:
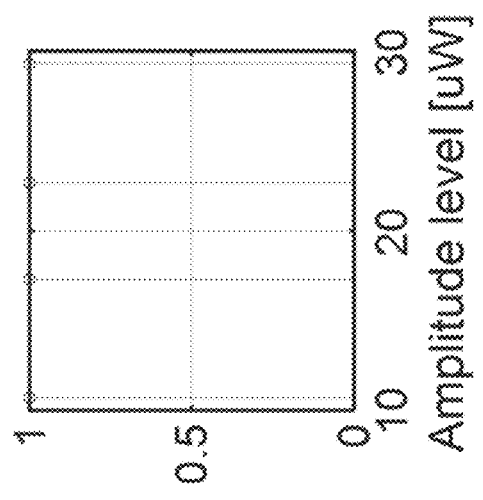

FIG. 6A-5C illustrate examples of new modulation formats resulting from the pairing of two ONUs with equal optical power levels at the OLT receiver and different extinction ratios. In the example of FIG. 6A it is considered to pair a first ONU with received optical power level at the OLT of −20 dBm and extinction ratio of 6 dB with a second ONU with received optical power level at the OLT of −20 dBm and extinction ratio of 6 dB. As insufficient distinguishable power levels are generated, the pairing of these two ONUs is not allowed. In the example of FIG. 6B it is assumed that a first ONU with received optical power level at the OLT of −20 dBm and extinction ratio of 6 dB is paired with a second ONU with received optical power level at the OLT of −20 dBm and extinction ratio of 4.5 dB. In the example of FIG. 6C it is assumed that a first ONU with received optical power level at the OLT of −20 dBm and extinction ratio of 6 dB is paired with a second ONU with received optical power level at the OLT of −20 dBm and extinction ratio of 3 dB. The latter two examples demonstrate that even when the power levels received at the OLT for different ONUs are identical, these ONUs may be pairable when their extinction ratios are sufficiently different, enabling to generate a PAM4 modulation format at the OLT transceiver.

Figure 7C:
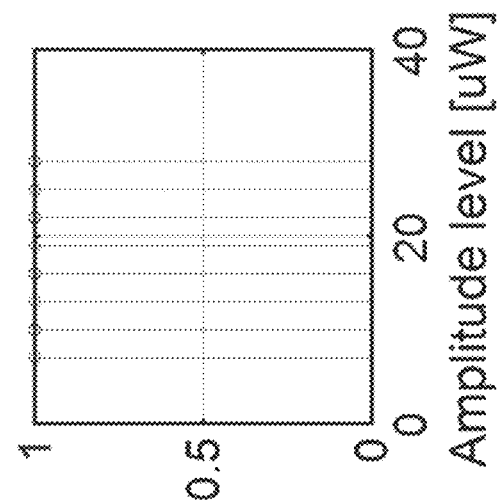
FIG. 7A-7C illustrate examples of new modulation formats resulting from the pairing of three ONUs with different optical power levels at the OLT and identical extinction ratios.
Figure 7B:
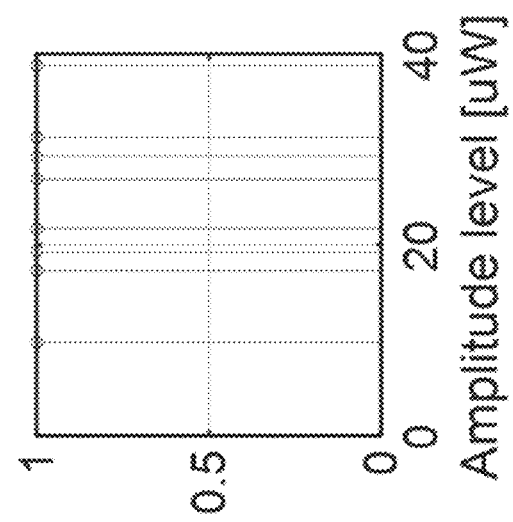
Figure 7A:
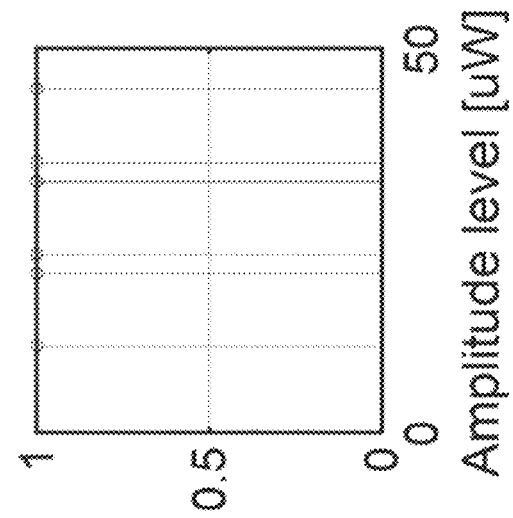

FIG. 7A-7C illustrate examples of new modulation formats resulting from the pairing of three ONUs with different optical power levels at the OLT and identical extinction ratios. In the example of FIG. 7A it is considered to pair a first ONU with received optical power level at the OLT of −20 dBm and extinction ratio of 6 dB with a second ONU with received optical power level at the OLT of −20 dBm and extinction ratio of 6 dB and a third ONU with received optical power level at the OLT of −21 dBm and extinction ratio of 6 dB. This triplet of ONUs however does not generate 8 distinguishable power levels at the OLT receiver by a PAM8 demodulator as a result of which the three ONUs cannot be paired in a single subset. In the example of FIG. 7B it is assumed that a first ONU with received optical power level at the OLT of −20 dBm and extinction ratio of 6 dB is paired with a second ONU with received optical power level at the OLT of −21 dBm and extinction ratio of 6 dB and a third ONU with received optical power level at the OLT of −22 dBm and extinction ratio of 6 dB. In the example of FIG. 7C it is assumed that a first ONU with received optical power level at the OLT of −20 dBm and extinction ratio of 6 dB is paired with a second ONU with received optical power level at the OLT of −23 dBm and extinction ratio of 6 dB and a third ONU with received optical power level at the OLT of −26 dBm and extinction ratio of 6 dB. The latter two examples, illustrated by FIG. 7B and FIG. 7C, illustrate that triplets of ONUs may generate acceptable PAM8 modulation formats.

Figure 8F:
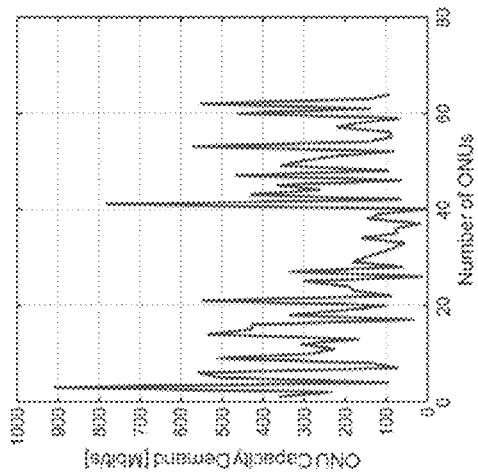
Figure 8G:
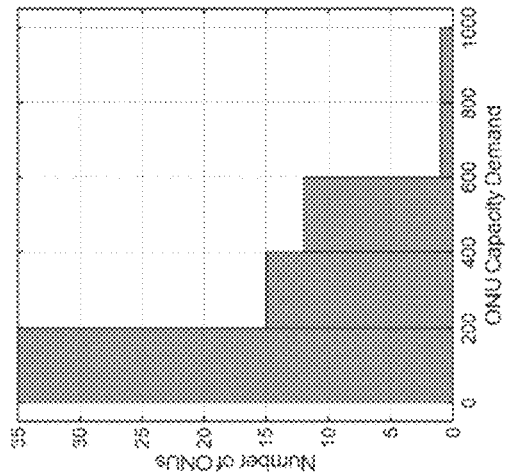

FIG. 8A-8G illustrate the input parameters for a sample embodiment of the device and method for controlling upstream transmission during a simulation. In the simulation, 64 ONUs were used. FIG. 8A shows the received power in dBm at the OLT as a function of the ONU number. FIG. 8B is a diagram showing the distribution of the 64 ONUs across certain ranges of received power at the OLT. The received power level at the OLT already gives an indication of which ONUs can be stacked. Preferably, an ONU with a high power level at the OLT is paired with an ONU having a low power level at the OLT. FIG. 8C is a diagram showing the distribution of ONUs across available power margin to the typical XGS-PON sensitivity level of −30 dBm. It shows for instance that in the simulation, 14 ONUs have a power margin of 7.5 dB. FIG. 8D illustrates the service priority level distribution of ONUs (or TCONTs to be upstream transmitted by the ONUs). The service priority level value ranges from 0, corresponding to low service priority, non-latency-critical ONUs, to 1, corresponding to high service priority, latency-critical ONUs, with increments of 0.2 for the service priority level. For the simulation, a normal distribution of the service priority levels was assumed for the upstream traffic. FIG. 8E shows the service priority level (value between 0 and 1) as a function of the ONU number for the 64 ONUs involved in the simulation. FIG. 8F illustrates the distribution of the ONUs across certain ranges of capacity demand, the capacity demand or throughput demand being expressed in Mbps. FIG. 8G shows the capacity demand as a function of ONU number for the 64 ONUs involved in the simulation. For the simulation, a Gaussian distribution of the capacity demand has been assumed. All foregoing parameters served as input to the steps 305-307 of FIG. 3 during a simulation.

In order to identify potential subsets of ONUs that can be time-stacked in step 305, the following rules were applied during the simulation. If the power margin is larger than 7 dB, the corresponding ONU can be used alone, generating NRZ modulation format at the OLT, can be paired with one other ONU, generating PAM4 modulation format at the OLT, or can be paired with two other ONUs, generating PAM8 modulation format at the OLT. If the power margin is equal to or larger than 4.8 dB, the corresponding ONU can be used alone, generating NRZ modulation format at the OLT, or can be paired with one other ONU, generating PAM4 modulation format at the OLT. If the power margin is smaller than 4.8 dB, the corresponding ONU can be used alone, generating NRZ modulation format at the OLT. Moreover, in the simulation, a service priority level equal to or higher than 0.6 requires the use of a single burst per time interval to avoid any latency penalty from any time-stacking. ONUs (or TCONTs) with a service priority level below 0.6 can be time-stacked.

Figure 9A:
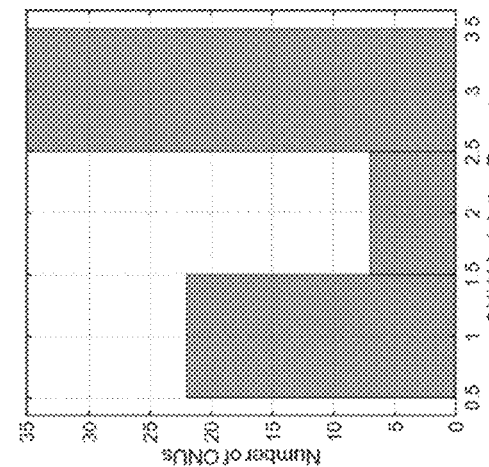
FIG. 9A-9B illustrate the pairing of ONUs in a sample embodiment of the device and method for controlling upstream transmission during the simulation with input parameters as illustrated by FIG. 8A-8G.
Figure 9B:
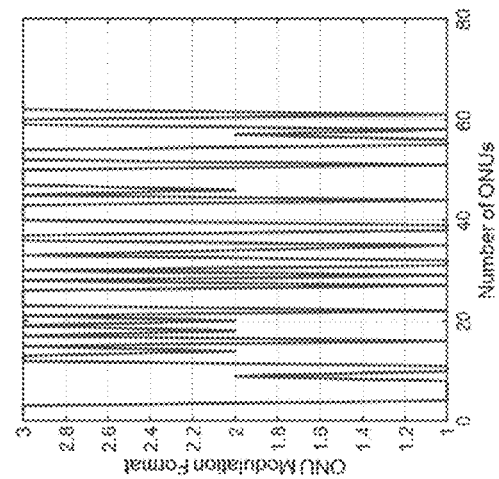

The outcome of steps 305-307 for the simulation with above defined input parameters is illustrated by FIG. 9A-9B. FIG. 9A shows the modulation format as a function of the ONU number. The modulation format is either 1, corresponding to NRZ for ONUs that are not paired, or 2, corresponding to PAM4 for ONUs that are paired with one other ONU, or 3, corresponding to PAM8 for ONUs that are paired with two other ONUs. The distribution of ONUs across the different modulation formats is shown in FIG. 9B.

Figures 10A, 10B:
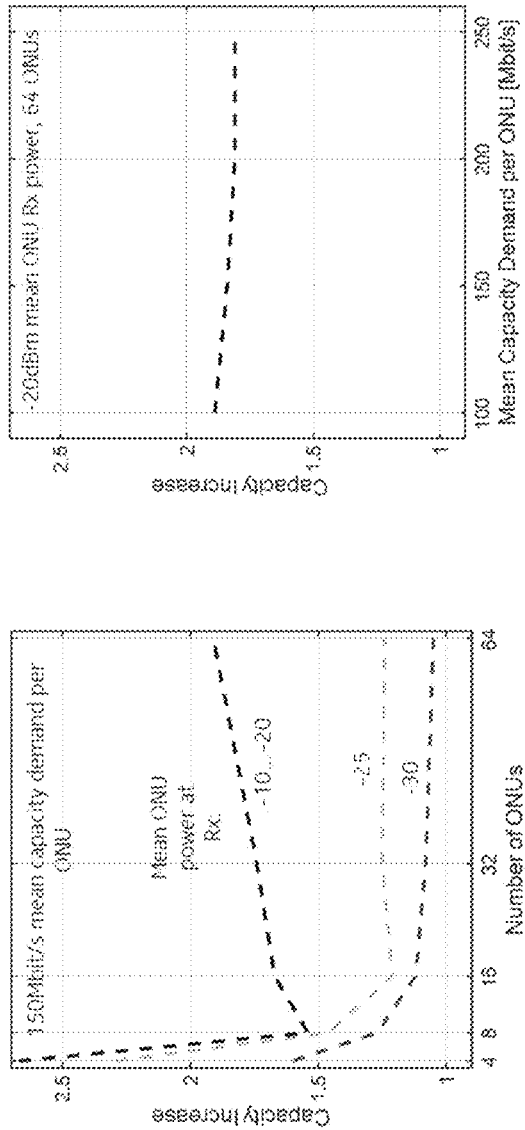
FIG. 10A-10B illustrate the capacity increase for a sample embodiment of the device and method for controlling upstream transmission during the simulation with input parameters as illustrated by FIG. 8A-8G.

FIG. 10A-10B at last illustrate the capacity increase for a sample embodiment of the device and method for controlling upstream transmission during the simulation with input parameters as illustrated by FIG. 8A-8G. In FIG. 10A, the capacity increase is presented as a function of the number of active ONUs in the PON for a mean capacity demand of 150 Mbps for different mean ONU power levels available at the OLT receiver. As long as the PON deployment provides some system margin, a capacity increase of close to a factor 2 can be achieved, even with a large number of active ONUs in the PON. FIG. 10B illustrates that the increase in throughput is almost independent of the capacity demand for the case of 64 ONUs and a sufficiently large power margin. The advantage of the proposed upstream bandwidth allocation obviously lies in the applied learning of ONU and PON parameters to optimize the use of the components in upstream direction for increased throughput or reduced latency. In terms of cost, the proposed upstream bandwidth allocation has no substantive impact as the transceivers at the ONUs need not be replaced by significantly more complex transceivers. Thus, the proposed upstream bandwidth allocation method can reduce the cost/bit in upstream direction. Some complexity is shifted towards the OLT requiring a special receiver or DSP functions for the new modulation formats resulting from pairing or time-stacking ONUs. Depending on the desired flexibility and adaptability, additional functionalities can be added to the ONU to increase for instance the tunability for wavelength, transmitted optical power and extinction ratio. In addition, in case that the system margin would be too low to apply the scheme, an optical amplifier or a coherent reception scheme could be used at the OLT receiver, where it represents a shared cost across all ONUs, to allow for the time-stacking. The flexibility to generate more options for time-stacking ONUs must be trade-off versus cost.

Figure 11:
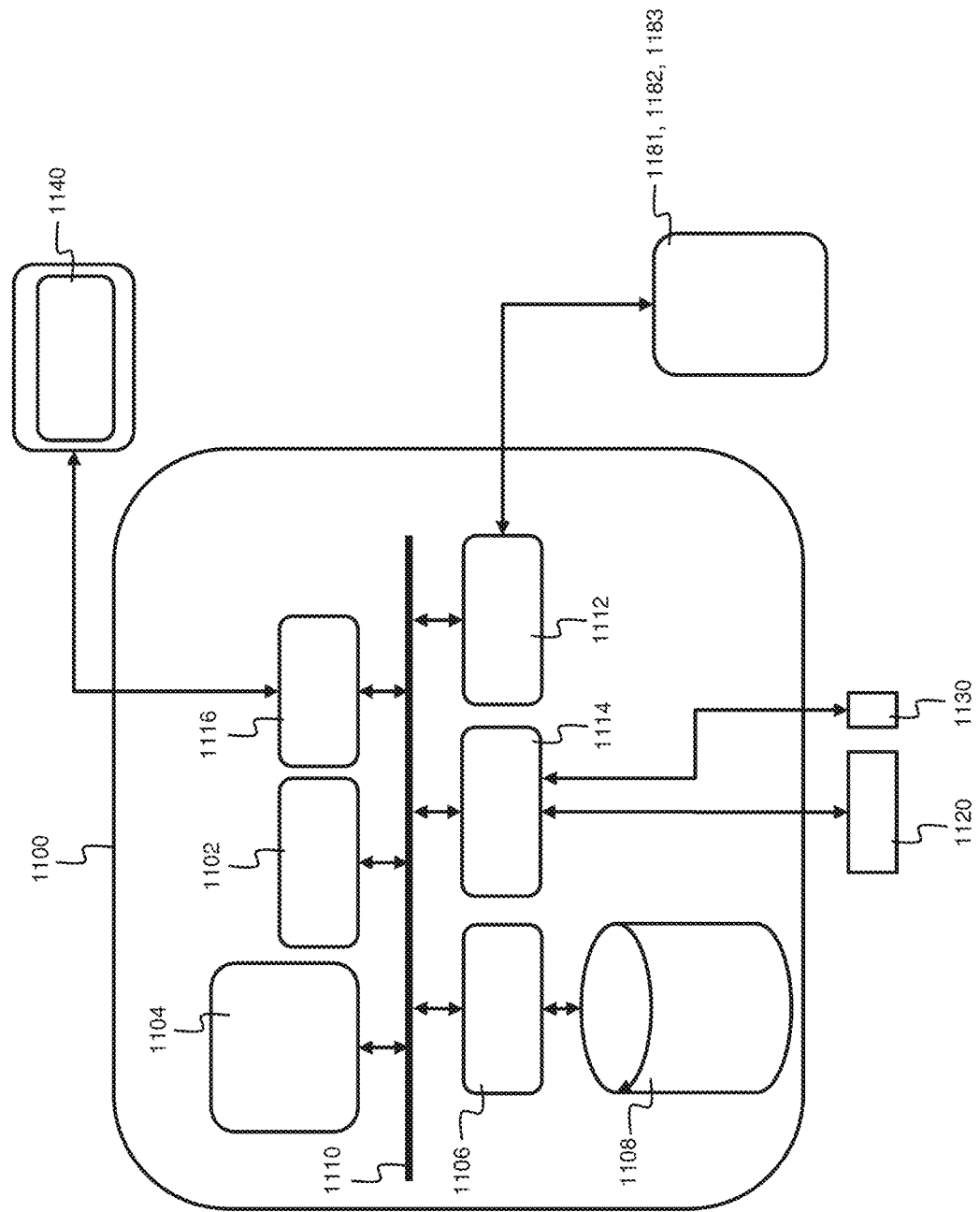
FIG. 11 shows an example embodiment of a suitable computing system 1100 for performing one or several steps in embodiments of the method for controlling upstream transmission.

FIG. 11 shows a suitable computing system 1100 enabling to implement embodiments of the method for controlling upstream transmission in a PON. Computing system 1100 may in general be formed as a suitable general-purpose computer and comprise a bus 1110, a processor 1102, a local memory 1104, one or more optional input interfaces 1114, one or more optional output interfaces 1116, a communication interface 1112, a storage element interface 1106, and one or more storage elements 1108. Bus 1110 may comprise one or more conductors that permit communication among the components of the computing system 1100. Processor 1102 may include any type of conventional processor or microprocessor that interprets and executes programming instructions. Local memory 1104 may include a random-access memory (RAM) or another type of dynamic storage device that stores information and instructions for execution by processor 1102 and/or a read only memory (ROM) or another type of static storage device that stores static information and instructions for use by processor 1102. Input interface 1114 may comprise one or more conventional mechanisms that permit an operator or user to input information to the computing device 1100, such as a keyboard 1120, a mouse 1130, a pen, voice recognition and/or biometric mechanisms, a camera, etc. Output interface 1116 may comprise one or more conventional mechanisms that output information to the operator or user, such as a display 1140, etc. Communication interface 1112 may comprise any transceiver-like mechanism such as for example one or more Ethernet interfaces that enables computing system 1100 to communicate with other devices and/or systems, for example with other computing devices 1181, 1182, 1183. The communication interface 1112 of computing system 1100 may be connected to such another computing system by means of a local area network (LAN) or a wide area network (WAN) such as for example the internet. Storage element interface 1106 may comprise a storage interface such as for example a Serial Advanced Technology Attachment (SATA) interface or a Small Computer System Interface (SCSI) for connecting bus 1110 to one or more storage elements 1108, such as one or more local disks, for example SATA disk drives, and control the reading and writing of data to and/or from these storage elements 1108. Although the storage element(s) 1108 above is/are described as a local disk, in general any other suitable computer-readable media such as a removable magnetic disk, optical storage media such as a CD or DVD, -ROM disk, solid state drives, flash memory cards, . . . could be used. Computing system 1100 could thus correspond to the controller circuitry deployed in the central office 110 of FIG. 1 or in a network controlling entity of the PON illustrated by FIG. 1.

As used in this application, the term "circuitry" may refer to one or more or all of the following:

(a) hardware-only circuit implementations such as implementations in only analog and/or digital circuitry and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A device for controlling upstream transmission of bursts from optical network units (ONUs) to an optical line termination (OLT) in a passive optical network (PON) said upstream transmission being organized in time intervals that form part of an upstream timeframe, wherein said device comprises:
a memory storing instructions; and
a processor configured to execute the instructions to cause the device to,
obtain respective optical power levels received at said OLT for said ONUs,
obtain respective extinction ratios at said OLT for said ONUs,
obtain respective transmission wavelengths for said ONUs,
distinguish pairable ONUs and non-pairable ONUs amongst said ONUs at least based on said wavelengths,
pair said pairable ONUs based on at least one of said optical power levels or said extinction ratios to generate one or plural subsets of paired ONUs, and
allow paired ONUs that belong to a same subset amongst said subsets to simultaneously transmit bursts within a time interval of said upstream timeframe.

2. The device for controlling upstream transmission in a PON as defined by claim 1, wherein the processor is further configured to cause the device to:
allow one of the non-pairable ONUs to transmit a burst spanning multiple time intervals.

3. The device for controlling upstream transmission in a PON as defined by claim 1, wherein the pairing statically pairs said pairable ONUs in a static configuration of subsets.

4. The device for controlling upstream transmission in a PON as defined by claim 1, wherein the pairing dynamically pairs said pairable ONUs based on updated service demands from said ONUs into a dynamic changing configuration of subsets.

5. The device for controlling upstream transmission in a PON as defined by claim 1, wherein the processor is further configured to cause the device to:
instruct an ONU of said pairable ONUs to configure at least one of an optical transmit power, an extinction ratio, a wavelength, or a phase thereof.

6. The device for controlling upstream transmission in a PON as defined by claim 1, wherein the processor is further configured to cause the device to:
obtain at least one of capacity demands or latency demands from said ONUs in order to enable distinguishing said pairable ONUs from said non-pairable ONUs amongst said ONUs.

7. The device for controlling upstream transmission in a PON as defined by claim 1, wherein the processor is further configured to cause the device to:
instruct an ONU of the ONUs to at least one of (i) add idle data to the bursts of the ONU or (ii) add a phase shift or a time shift to equalize the length of said bursts simultaneously transmitted within said time interval by the paired ONUs that belong to said same subset.

8. A device for controlling upstream transmission in a PON as defined by claim 1, wherein the processor is further configured to cause the device to:
obtain respective power margins for said ONUs,
wherein the pairing
generates a subset of three paired ONUs whose respective power margins exceed a first power margin threshold,
generates a subset of two paired ONUs whose respective power margins exceed a second power margin threshold smaller than said first power margin threshold, and
leaves ONUs whose power margin is smaller than said second power margin threshold unpaired.

9. A method for controlling upstream transmission of bursts from optical network units (ONUs) to an optical line termination (OLT) in a passive optical network (PON) said upstream transmission being organized in time intervals that form part of an upstream timeframe, wherein said method comprises:
obtaining respective optical power levels received at said OLT for said ONUs;
obtaining respective extinction ratios at said OLT for said ONUs;
obtaining respective transmission wavelengths for said ONUs;
distinguishing pairable ONUs and non-pairable ONUs amongst said ONUs at least based on said wavelengths;
pairing said pairable ONUs based on at least one of said optical power levels or said extinction ratios to generate one or plural subsets of paired ONUs; and
allowing paired ONUs that belong to a same subset amongst said subsets to simultaneously transmit bursts within a time interval of said upstream timeframe.

10. A non-transitory computer readable storage medium storing computer-executable instructions, which when executed by a device, configure the device to control upstream transmission bursts from optical network units (ONUs) to an optical line termination (OLT) in a passive optical network (PON), said upstream transmission being organized in time intervals that form part of an upstream timeframe, and the device configured to control upstream transmission bursts by:
obtaining respective optical power levels received at said OLT for said ONUs;
obtaining respective extinction ratios at said OLT for said ONUs;
obtaining respective transmission wavelengths for said ONUs;
distinguishing ONUs and non-pairable ONUs amongst said ONUs at least based on the wavelengths;
pairing said pairable ONUs based on at least one of said optical power levels or said extinction ratios to generate one or plural subsets of paired ONUs; and
allowing paired ONUs that belong to a same subset amongst said subsets to simultaneously transmit bursts within a time interval of said upstream timeframe.

* * * * *